Jan. 15, 1963 H. J. DEVON 3,073,435
LICENSE PLATE MAILING PACKAGE
Filed Oct. 22, 1956
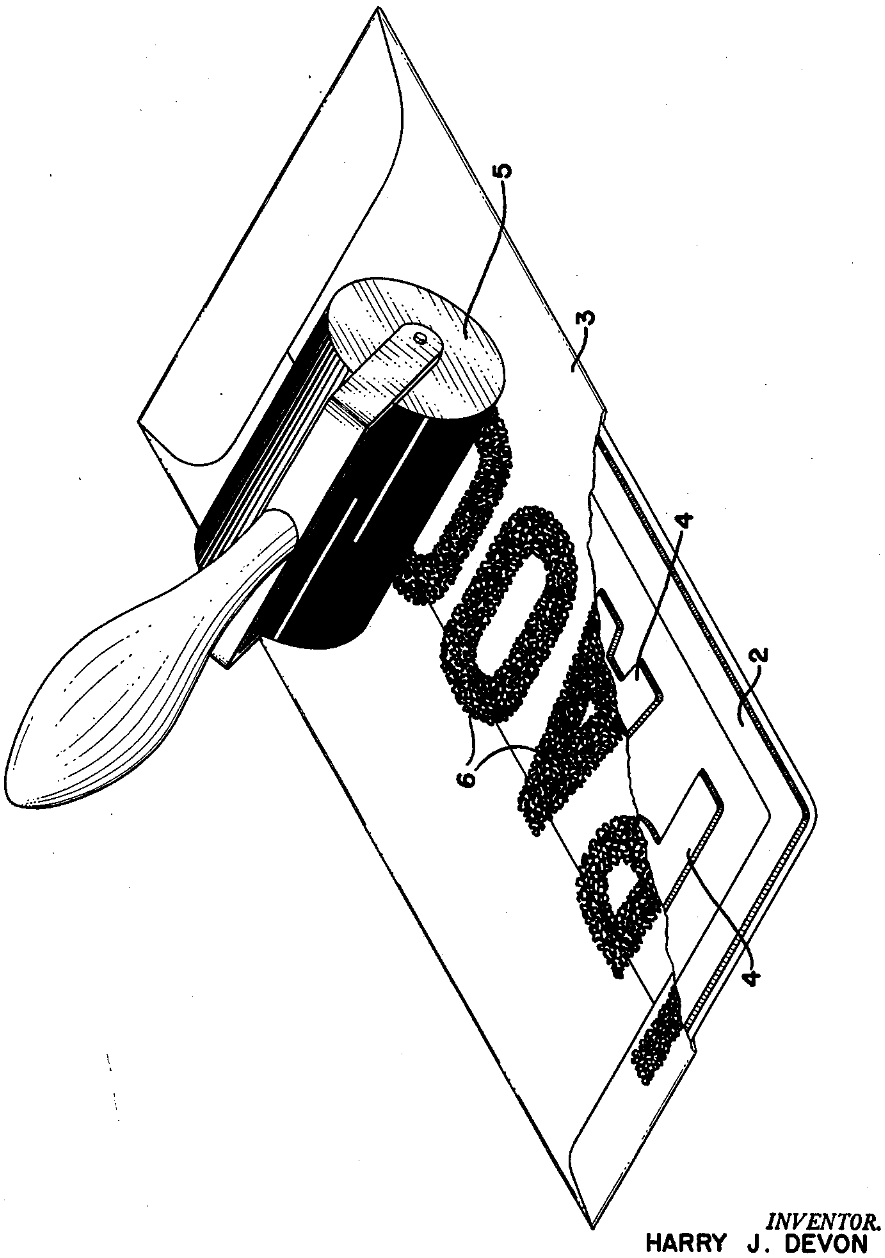
INVENTOR.
HARRY J. DEVON
BY Hooper, Leonard & Buell
his attorneys United States Patent Office 3,073,435
Patented Jan. 15, 1963

3,073,435
LICENSE PLATE MAILING PACKAGE

Harry J. Devon, Mount Lebanon, Pa., assignor, by mesne assignments, to Pittsburgh Envelope Company, Pittsburgh, Pa., a corporation of Pennsylvania Filed Oct. 22, 1956, Ser. No. 617,630
1 Claim. (Cl. 206—46)

This invention relates to a license plate mailing package and preparation thereof. It has to do with the packaging for mailing of license plates so as to obviate the possibility of error in marking upon the outside of the package the same character or series of characters as is or are embossed in the license plate within the package or the possibility of error in association with the license plate of a registration card bearing the same character or series of characters.

For purposes of explanation and illustration the invention will be described in connection with the packaging of a motor vehicle license plate although the invention is not so limited and is applicable to any plate having therein an embossed character or embossed characters of size comparable to that of the embossed character or characters of a motor vehicle license plate. Millions of motor vehicle license plates are mailed each year by the various States of the United States. Different States employ different systems but most or all of the systems require correlation between the character or characters embossed in the license plate being packaged and a character or characters to appear either on the exterior of the package or on a card associated with the package, as, for example, in a small envelope integral with the package. In Pennsylvania, for example, the motor vehicle registration card is placed in an envelope integral with the package containing the license plate and the license plate and registration card are mailed together. Heretofore the license plate packages (normally large brown paper envelopes) have had the license numbers separately printed thereon and the clerks packaging the license plates for mailing have tried to insert each license plate into the package or envelope having the same license number printed on it and also to insert in the small envelope integral with the envelope holding the license plate the registration card also bearing the same license number. Frequent errors occured, license plates being inserted into the wrong envelopes. The result of this was that many motor vehicle owners received a license plate bearing one number and a registration card bearing a different number.

I have devised a license plate mailing package and a method of preparing such a package obviating any possibility of error as to the character or characters embossed on the license plate within the package. I provide for unerringly marking on the exterior of the package the exact character or characters embossed in the license plate therewithin. I do so by using the license plate embossing as a sort of printing plate or form and by the use thereof printing upon the exterior of the package the character or characters embossed in the license plate. Thus in inserting the registration cards in the envelopes which are integral with the license plate packages the clerks have in all cases the exact license plate numbers before them and can directly visually compare the numbers on the registration cards with the license plate numbers.

I provide a license plate mailing package comprising an embossed license plate with a covering of flexible material disposed thereabout, the covering having on its exterior a marking corresponding in size to and superimposed upon the embossing of the license plate. I use the word "mailing" as a word of broad definition and not of limitation, that word comprehending a package suitable for transmission through the United States mail or other delivery system. The marking on the exterior of the package is formed by application of marking material thereto at the portion of the covering which is backed up by the embossing of the license plate.

More specifically the license plate mailing package may comprise an envelope with an embossed license plate therein, the envelope having on its exterior a marking corresponding in size to and superimposed upon the embossing of the license plate. The marking is preferably an inked marking, the word "inked" being used as a term of broad definition and not of limitation and including markings made by printer's ink and other equivalent or similar marking substances.

I further provide a method of preparing a license plate mailing package comprising covering an embossed license plate with flexible material and by means having marking material thereon pressing from the exterior the flexible material against the embossing of the license plate whereby to form on the exterior of the covering a marking corresponding in size to and superimposed upon the embossing of the license plate. The means having marking material thereon are preferably inked means. The inked means may take various forms, for example, plate form or roller form. I prefer to roll an inked roller over the package or envelope containing the embossed license plate to thereby form on the exterior of the package or envelope an inked marking corresponding in size to and superimposed upon the embossing of the license plate.

Other details, objects and advantages of the invention will become apparent as the following description of a present preferred embodiment thereof and a present preferred method of practicing the same proceeds.

In the accompanying drawing I have shown a present preferred embodiment of the invention and have illustrated a present preferred method of practicing the same, the FIGURE being a perspective view of a license plate mailing package showing how the package is prepared.

An embossed license plate 2 is placed in an envelope 3. The embossed license plate 2 may be, for example, a motor vehicle license plate having characters 4 constituting the "license number" embossed therein. The embossed license plate 2 may be made of metal, fiber, plastic or other suitable material. The envelope 3 may be made of paper or any other suitable flexible material.

The embossed characters 4 of the plate 2 are, by reason of their being embossed in the plate, raised above the surrounding area of the plate. Consequently, the paper of the envelope 3 may rest against the embossing constituted by the characters 4 and intermediate the characters bridge over the intervening space, being slightly spaced from the area of the plate surrounding the embossed characters.

After the license plate 2 has been inserted into the envelope 3 I press against the exterior of the envelope opposite the embossed characters 4 by means having marking material, preferably printer's ink, thereon whereby to form on the exterior of the envelope a marking 6 corresponding in size to and superimposed upon the embossing of the license plate. I show the marking on the exterior of the envelope as having been formed by rolling an inked roller 5 over the envelope opposite the embossed characters 4. The embossed characters of the license plate act in the nature of a printing plate or form, backing up the paper or other material of the envelope 3 so that the material of the envelope is pressed between the inked roller 5 and the characters 4 but is not so pressed opposite the area of the plate surrounding the characters. The result is reproduction in ink on the exterior of the envelope of the license number appearing in embossed characters on the license plate, such reproduction being designed by reference numeral 6.

Of course the printing of the characters on the exterior of the envelope will not be as sharp as normal printing when an inked form prints upon paper pressed into contact therewith but the printing is clear enough that the license number may easily be read. The relatively large size of the characters 4 makes my process feasible.

A smaller envelope for containing the registration card may be integral with the envelope 3 containing the license plate as is customary in Pennsylvania and other States. The clerk when inserting the numbered registration card in the small envelope may directly compare the number on that card with the number unerringly printed on the large envelope containing the license plate by my method as described above. Thus errors due to mailing to a motor vehicle registrant of a license plate bearing one license number and a registration card bearing another license number are substantially eliminated.

While I have shown and described a present preferred embodiment of the invention and have illustrated a present preferred method of practicing the same it is to be distinctly understood that the invention is not limited thereto but may be otherwise variously embodied and practiced within the scope of the following claim.

I claim:

A license plate mailing package comprising a license plate having embossed indicia therein, an envelope having front and back panels enclosing said plate, the embossed indicia being in face contact with one of said panels, said last named panel having indicia printed on its exterior, said indicia corresponding in size to, superimposed upon and coinciding with the embossed indicia of the enclosed license plate.

References Cited in the file of this patent

UNITED STATES PATENTS

| | | |
|---|---|---|
| 1,129,573 | Johnson | Feb. 23, 1915 |
| 1,397,444 | Mohr | Nov. 15, 1921 |
| 1,521,417 | Bain et al. | Dec. 30, 1924 |
| 1,611,929 | McKay et al. | Dec. 28, 1926 |
| 1,629,944 | Adams | May 24, 1927 |
| 1,660,250 | Bogue et al. | Feb. 21, 1928 |
| 1,801,593 | Dugdale | Apr. 21, 1931 |
| 2,039,074 | Farrington | Apr. 28, 1936 |
| 2,276,387 | Gurwick | Mar. 17, 1942 |
| 2,277,642 | Hayes | Mar. 24, 1942 |
| 2,305,127 | Albers | Dec. 15, 1942 |
| 2,354,083 | Bixby | July 18, 1944 |
| 2,469,366 | Burbank | May 10, 1949 |
| 2,620,730 | Gilbert | Dec. 9, 1952 |

FOREIGN PATENTS

| | | |
|---|---|---|
| 274,172 | Great Britain | July 8, 1927 |